US011967038B2

(12) United States Patent
Li et al.

(10) Patent No.: US 11,967,038 B2
(45) Date of Patent: Apr. 23, 2024

(54) SYSTEMS AND METHODS FOR IMAGE DISPLAY

(71) Applicant: ZHEJIANG DAHUA TECHNOLOGY CO., LTD., Zhejiang (CN)

(72) Inventors: Qiankun Li, Hangzhou (CN); Wei Lu, Hangzhou (CN); Jun Yin, Hangzhou (CN); Xingming Zhang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 372 days.

(21) Appl. No.: 17/304,745

(22) Filed: Jun. 25, 2021

(65) Prior Publication Data
US 2022/0261953 A1     Aug. 18, 2022

Related U.S. Application Data

(63) Continuation of application No. PCT/CN2018/124631, filed on Dec. 28, 2018.

(51) Int. Cl.
*G06T 3/40* (2006.01)
*G06T 3/00* (2006.01)
(Continued)

(52) U.S. Cl.
CPC ............... *G06T 3/005* (2013.01); *G06T 3/40* (2013.01); *G06T 3/60* (2013.01); *G06T 11/60* (2013.01); *H04N 23/53* (2023.01); *H04N 23/698* (2023.01)

(58) Field of Classification Search
None
See application file for complete search history.

(56) References Cited

U.S. PATENT DOCUMENTS 6,639,596 B1    10/2003   Shum et al.
2003/0063816 A1  4/2003   Chen et al.
(Continued)

FOREIGN PATENT DOCUMENTS

CN      101587481 A     11/2009
CN      102957895 A      3/2013
(Continued)

OTHER PUBLICATIONS

International Search Report in PCT/CN2018/124631 dated Sep. 26, 2019, 4 pages.
(Continued)

*Primary Examiner* — Eileen M Adams
(74) *Attorney, Agent, or Firm* — METIS IP LLC

(57) ABSTRACT

A system and method for jointly displaying an image and a map is disclosed. The method may including obtaining an image captured by a camera. The image may include a target in a surrounding environment of the camera. The method may further include obtaining a map of the surrounding environment. The map may at least include a location corresponding to the target and a location corresponding to the camera. The method may jointly display the image and the map, wherein a representation of the image is aligned with the location corresponding to the target and the location corresponding to the camera in the map.

18 Claims, 11 Drawing Sheets

(51) Int. Cl.
*G06T 3/60* (2006.01)
*G06T 11/60* (2006.01)
*H04N 23/53* (2023.01)
*H04N 23/698* (2023.01)

(56) References Cited

U.S. PATENT DOCUMENTS

| | | | |
|---|---|---|---|
| 2005/0034074 A1* | 2/2005 | Munson | G09B 29/106 |
| | | | 715/713 |
| 2011/0141141 A1* | 6/2011 | Kankainen | G01C 21/3647 |
| | | | 348/E7.001 |
| 2012/0268620 A1 | 10/2012 | Nomura et al. | |
| 2013/0147844 A1 | 6/2013 | Isozu et al. | |
| 2013/0346916 A1 | 12/2013 | Williamson et al. | |
| 2016/0100104 A1 | 4/2016 | Furumura et al. | |
| 2019/0199921 A1* | 6/2019 | Oh | H04N 19/597 |

FOREIGN PATENT DOCUMENTS

| | | |
|---|---|---|
| CN | 103245349 A | 8/2013 |
| CN | 103517035 A | 1/2014 |
| KR | 20170022607 A | 3/2017 |

OTHER PUBLICATIONS

Written Opinion in PCT/CN2018/124631 dated Sep. 26, 2019, 4 pages.
Communication Pursuant to Article 94(3) EPC in European Application No. 18944639.6 dated May 17, 2023, 7 pages.
The Extended European Search Report in European Application No. 18944639.6 dated Oct. 27, 2021, 7 pages.
"Google Earth 4 3D Buildings", Web page <http://www.youtube.com/watch?v=XzCbhhC6ZAQ>, Sep. 8, 2021.

* cited by examiner

SYSTEMS AND METHODS FOR IMAGE DISPLAY

CROSS-REFERENCE TO RELATED APPLICATIONS

This application is a Continuation of International Application No. PCT/CN2018/124631, filed on Dec. 28, 2018, the entire contents of which are hereby incorporated by reference.

TECHNICAL FIELD

This disclosure generally relates to image display, and more particularly, relates to systems and methods for jointly displaying an image and a map.

BACKGROUND

Various techniques has been exploited to capture and display images that cover a sufficient large field of view (FOV).

In some embodiments, multi-cameras are utilized in the surveillance of a large occasion, such as, a playground, a plaza, an airport, to form the sufficiently large FOV. However, it may be difficult to efficiently display the images taken by the multi-cameras in a user-friendly manner.

In some embodiments, a panoramic device may be used to capture panoramic images with an FOV approximate to or even beyond 180 degrees. A virtual reality (VR) helmet may be used to present the panoramic image in different perspectives according to the movement of the helmet. However, the VR helmet is not suitable for simultaneous viewing by multiple people.

SUMMARY

According to an aspect of the present disclosure, a system is provided. The system may include at least one storage medium including a set of instructions, and at least one processor in communication with the at least one storage medium. When executing the set of instructions, the at least one processor may be directed to cause the system to obtain an image captured by a camera. The image may include a target in a surrounding environment of the camera. The at least one processor may be further directed to cause the system to obtain a map of the surrounding environment. The map may at least include a location corresponding to the target and a location corresponding to the camera. The at least one processor may be further directed to cause the system to jointly display the image and the map, wherein a representation of the image is aligned with the location corresponding to the target and the location corresponding to the camera in the map.

In some embodiments, the image captured by the camera may be a panorama.

In some embodiments, to jointly display the image and the map, the at least one processor may be directed to cause the system to project a content of the map onto a first imaging surface to form a representation of the map, and project a content of the image onto a second imaging surface to form the representation of the image. The at least one processor may be further directed to cause the system to jointly display the representation of the map and the representation of the image.

In some embodiments, the second imaging surface may include a cylindrical surface.

In some embodiments, the representation of the map may be formed according to a first projection relationship associated with the map, and the representation of the image may be formed according to a second projection relationship associated with the image.

In some embodiments, the first projection relationship may include a first rotation angle associated with an orientation of the map.

In some embodiments, the second projection relationship may include a second rotation angle associated with the representation of the image on the second imaging surface.

In some embodiments, the at least one processor may be further directed to cause the system to receive an instruction to adjust an orientation of the joint display of the image and the map. The at least one processor may be further directed to cause the system to adjust the first rotation angle associated with the orientation of the map and the second rotation angle associated with the representation of the image on the second imaging surface, and update the joint display of the image and the map according to the adjusted first rotation angle and the adjusted second rotation angle.

In some embodiments, the first projection relationship may include a first scale associated with a zooming effect of the map.

In some embodiments, the second projection relationship may include a second scale associated with a zooming effect of the image.

In some embodiments, the at least one processor may be further directed to cause the system to receive an instruction to adjust a field of view in the joint display of the image and the map. The at least one processor may be further directed to cause the system to adjust the first scale associated with the zooming effect of the map and the second scale associated with the zooming effect of the image, and update the joint display of the image and the map according to the adjusted first scale and the adjusted second scale.

According to another aspect of the present disclosure, a method is provided. The method may be implemented on a device having at least one storage medium including a set of instructions, and at least one processor in communication with the at least one storage medium. The method may include obtaining an image captured by a camera. The image may include a target in a surrounding environment of the camera. The method may further include obtaining a map of the surrounding environment. The map may at least include a location corresponding to the target and a location corresponding to the camera. The method may further include jointly displaying the image and the map, wherein a representation of the image is aligned with the location corresponding to the target and the location corresponding to the camera in the map.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are nonlimiting exemplary embodiments, in which like reference numerals represent similar structures throughout the several views of the drawings, and wherein.

DETAILED DESCRIPTION

Figure 1:
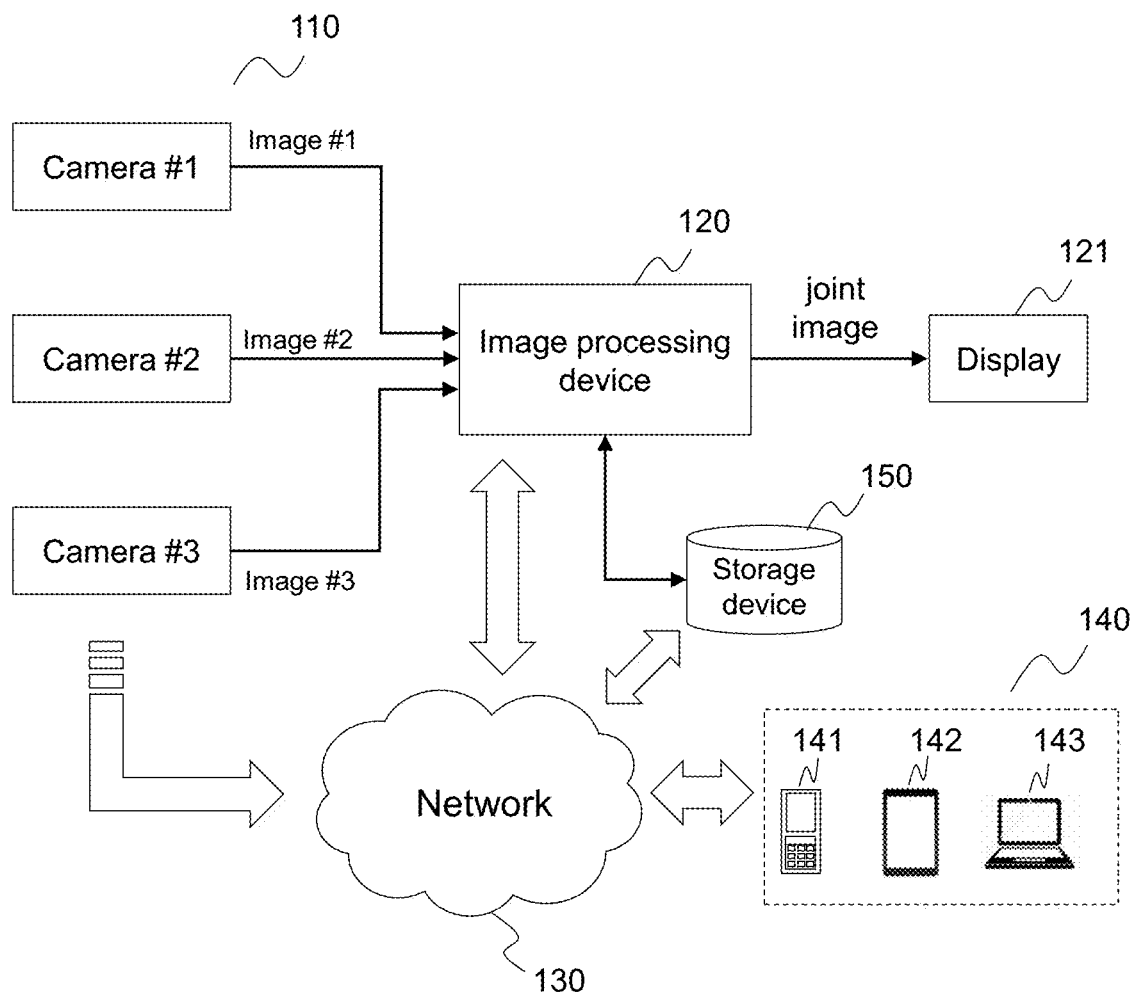
FIG. 1 is a schematic diagram illustrating an exemplary image displaying system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Technical solutions of the embodiments of the present disclosure be described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

In an aspect, the present disclosure is directed to systems and methods for jointly displaying a map and an image. In some embodiments, the image may be captured by a camera. The image may include a target in a surrounding environment of the camera. The map may include the information of the surrounding environment of the camera. The map may at least include a location corresponding to the target and a location corresponding to the camera. In some embodiments, to jointly display the image and the map, the map may be oriented such that a representation of the image is aligned with the location corresponding to the target and the location corresponding to the camera in the map.

FIG. 1 is a schematic diagram illustrating an exemplary image displaying system 100 according to some embodiments of the present disclosure. The image displaying system 100 may be configured to jointly display multiple pictures. In some embodiments, the multiple pictures may include one or more images captured by one or more cameras and a map indicating the surrounding environment of the one or more cameras. The joint display of the one or more images and the map may include presenting the content of the one or more images and the map in one or more imaging surfaces simultaneously. For example, the content of the one or more images may be displayed as a stereogram in a cylindrical imaging surface, and at the same time, the map may be displayed on a plane imaging surface in a manner aligning with the stereogram. In some embodiments, the one or more images may include a combined image that is generated by stitching images captured by a plurality of cameras.

The image displaying system 100 may include a plurality of cameras 110, an image processing device 120, a network 130, one or more terminal devices 140, and a storage device 150. The image displaying system 100 may further include other components according to actual needs.

The plurality of cameras 110 (e.g., cameras #1, #2, and #3 illustrated in FIG. 1) may each generate an image or a video including a plurality of frames. As used herein, an image may be a photo, a frame of a video, a picture, a spectrum, or the like, or a combination thereof. The image may be of or presented in an analog form (e.g., an electric signal carrying the image data) or a digital form (e.g., a digital file including the image data). The plurality of cameras 110 may sense light, waves, radiations, etc., to generate corresponding images.

In some embodiments, each of the plurality of cameras 110 may be a panoramic camera. Exemplary panoramic camera may include stereo cyclograph, wonder panoramic camera, handmade panoramic camera, rotating panoramic camera, fixed lens camera, or the like, or any combination thereof. A panoramic camera may generate a panoramic image. As used herein, a panoramic image may refer to an image showing a FOV having an angle equal to or greater than a specific threshold. The threshold may be 90 degrees, 120 degrees, 140 degrees, 160 degrees, 180 degrees, etc. In some embodiments, the panoramic image may show a FOV greater than the human eye. In some embodiments, the panoramic image may be generated by combining a plurality of component images taken by the panoramic camera. The plurality of component images may be with horizontally elongated fields of view.

The number of the plurality of cameras 110 may be set according to actual needs. For example, if the image generated by each camera 110 shows a FOV having an angle approximate to 90 degrees, the number of the cameras 110 may be four or more, such as six. If the image generated by each camera 110 shows a FOV having an angle approximate to 120 degrees, the number of the cameras 110 may be three or more, such as four.

In some embodiments, a portion or all of the plurality of cameras 110 may be included in a standalone imaging device, e.g., an integrated camera, a sonar, a night vision device, a thermal imaging device, a medical imaging device, or the like, or a combination thereof. For example, the cameras #1, #2, and #3 illustrated in FIG. 1 may be cameras of a multi-lens multi-sensor camera (or be referred to as a multi-lens camera for short).

In some embodiments, the plurality of cameras 110 may be independent from each other and installed at different locations. For example, the plurality of cameras 110 may be installed at a plurality of locations that are substantially distributed along a circle. The plurality of cameras 110 may work under a uniform working state, or different working states according to actual needs. For example, only a portion of the plurality of cameras 110 may be activated to capture images, with the remainders of the plurality of cameras 110 staying in a standby state.

The image processing device 120 may process the images (e.g., images #1 to #3) generated by the plurality of cameras 110. For example, the image processing device 120 may process the plurality of images to remove the overlapping region between them. As another example, the image processing device 120 may generate a combined image based on the plurality of images. As still another example, the image processing device 120 may determine the way to display one or more of the images. Specifically, the image processing device 120 may have a display function to jointly display the one or more images and a map indicating the surrounding environment of the plurality of cameras 110. To implement the joint display, the image processing device 120 may project the content of the map onto a first imaging surface to form a representation of the map (e.g., a first projected image) and project the content of the one or more images onto a second imaging surface to form a representation of the images (e.g., one or more second projected images). Then, the representation of the map and the representation of the one or more images may be jointly displayed on the image processing device 120.

In some embodiments, the image processing device 120 may adjust the joint display according to an instruction from a user. Exemplary instructions may include an adjustment of an orientation of the joint display, an adjustment of an FOV in the joint display, or the like, or a combination thereof. For example, the image processing device 120 may monitor an input device (e.g., a mouse, a keyboard) and recognize the instruction of the user by analyzing the motion of the input device. Specifically, the image processing device 120 may identify an instruction to adjust the orientation of the joint display through a drag-and-drop motion of the mouse, and adjust one or more parameters related to a first rotation angle associated with the orientation of the map and/or one or more second rotation angles associated with the representation of the images. Additionally, the image processing device 120 may adjust the FOV in the joint display by adjusting a first scale associated with a zooming effect of the map and a second scale associated with a zooming effect of the images.

Figure 2:
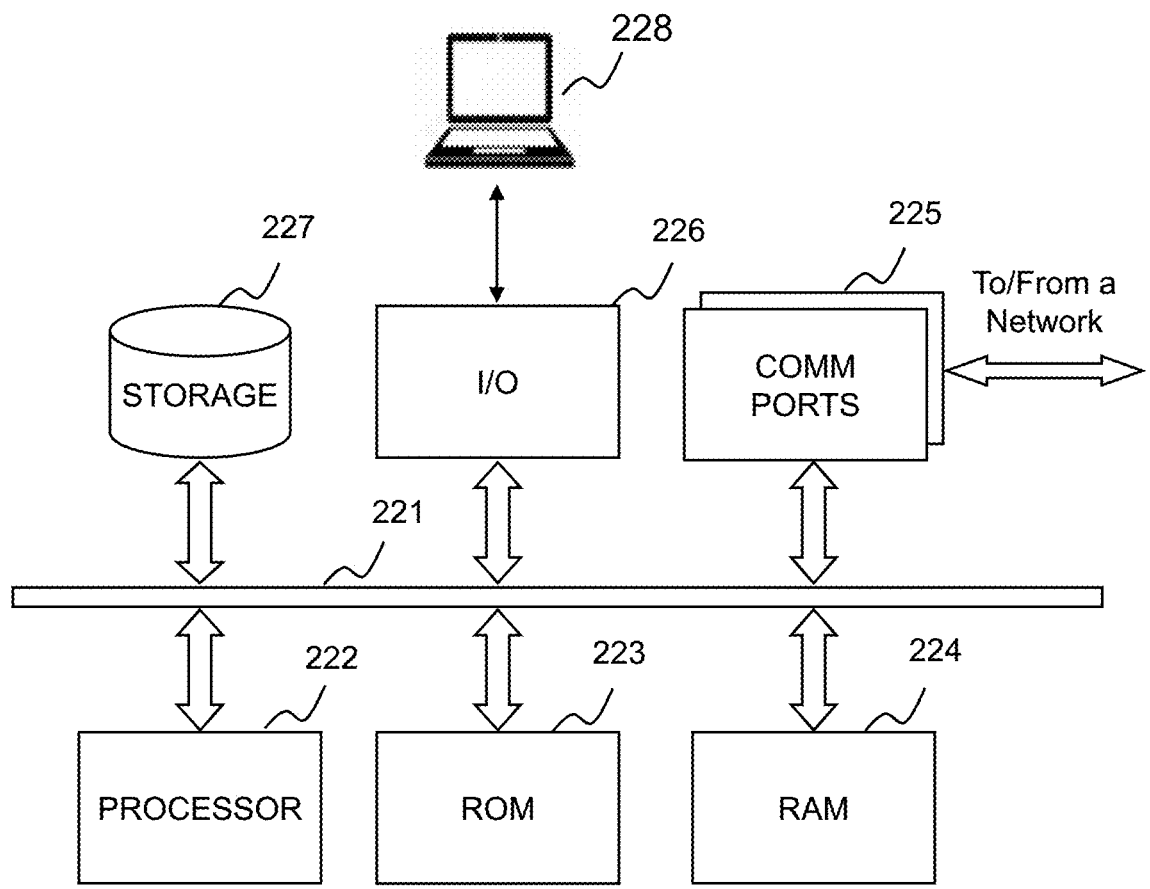
FIG. 2 is a schematic diagram illustrating exemplary hardware and/or software components of an exemplary computing device according to some embodiments of the present disclosure.

In some embodiments, the image processing device 120 may be implemented by a computing device as illustrated in FIG. 2.

The image processing device 120 may be in communication with the storage device 150 via one or more cables or the network 130. The storage device 150 may store or buffer the images generated by the plurality of cameras 110 before the images being processed by the image processing device 120. In some embodiments, the processed images may be stored or buffered in the storage device 150 before being outputted to, for example, the image processing device 120 for displaying, or the network 130 for transmitting. In some embodiments, the image displaying system 100 may include multiple storage devices (not shown in FIG. 1) for storing or buffering the images generated by the cameras #1, #2, and #3, respectively, and the storage device 150 for storing or buffering the processed image(s) generated by the image processing device 120.

The storage device 150 may be or may include a server, a mass storage, a removable storage, a volatile read-and-write memory, a read-only memory (ROM), a random-access memory (RAM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc.

In some embodiments, the storage device 150 may transfer data to the image processing device 120 using a burst transmission protocol. As used herein, a burst transmission protocol may refer to transmitting data stored in continuous storage units of the storage device 150 repeatedly without going through all the steps required to transmit each piece of data in a separate transmission.

For instance, without using a burst transmission protocol, to transmit each piece of data, the storage device 150 may first locate the storage unit that stores the piece of data and then access the piece of data stored therein. The locating of a storage unit may cost a number of clock cycles (e.g., 2, 3), which may cause a delay in the data transmission. By utilizing a burst transmission protocol, the storage device 150 may only have to locate the storage unit that stores the starting piece of data to be transmitted, transmit the starting piece of data, and then automatically transmit the piece of data stored in the storage unit next to the current storage unit repeatedly without locating it, until a predetermined number (burst length) of the storage units have been accessed. As a result, the time cost for transferring data stored in continuous storage units may be reduced. For example, when a locating of a storage unit costs 3 clock cycles, a transmission of a piece of data stored in a storage unit cost 1 clock cycle, to transfer data stored in 4 continuous storage units, without using the above burst transmission protocol, a total of 16 clock cycles may be cost (4 clock cycles for transferring each piece of data). However, in the above case, when the burst transmission protocol is adopted (with a burst length above 4), a total of 7 clock cycles may be cost (3 clock cycles for locating the storage unit that stores the starting piece of data, and 1 clock cycle for transferring each piece of data).

Normally, an image (or source image) received from any one of the plurality of cameras 110 or each part thereof may be stored in continuous storage units of the storage device 150. Such a storing manner of an image may be referred to as a continuity of an image. By utilizing a burst transmission protocol, time cost for transmitting the plurality of portions of the image to the image processing device 120 may be reduced.

It is understood that, the above burst transmission protocol is only for demonstration purpose and not intended to be limiting. Different types of the storage device 150 may adopt different type of the burst transmission protocol. In some embodiments, the storage device 150 may be a double data rate (DDR) memory, such as a DDR synchronous dynamic random-access memory (SDRAM), a low power DDR SDRAM (LP-DDR).

In some embodiments, the storage device 150 may also be configured to store instructions (e.g., in the form of a software, an application, a program) to be executed by the image processing device 120 (or one or more processor thereof). The instructions, when executed by the image processing device 120, may cause the image processing device 120 to perform the processes disclosed in the present disclosure related to the joint display of images.

The image processing device 120 may receive images (e.g., source images) generated by the plurality of cameras 110, and a map via one or more cables or the network 130. In some embodiments, the plurality of cameras 110 and the image processing device 120 may form a multi-channel camera system. In some embodiments, the plurality of cameras 110 and the image processing device 120 may be combined to form a single device, such as a multi-lens camera with the function of processing image data.

The network 130 may include any suitable network that may facilitate a transmission of data and signals between the components of the image displaying system 100. For example, the network 130 may facilitate a transmission of image from the plurality of cameras 110 to the image processing device 120 (or the storage device 150).

The network 130 may be and/or include one or more types of networks. For example, the network 130 may be and/or include a public network (e.g., the Internet), a private network (e.g., a local area network (LAN), a wide area network (WAN)), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a Bluetooth™ network, a ZigBee™ network, a near field communication (NFC) network, or the like, or any combination thereof. The network 130 may also include wired and/or wireless network access points, such as base stations, internet exchange points, routers, hubs, gateways, switches, server computers, and/or any combination thereof.

The terminal device 140 may receive images or videos from the plurality of cameras 110, the image processing device 120, and/or the storage device 150 via the network 130. In some embodiments, the terminal device 140 may also provide a user interface for a user to control the plurality of cameras 110 and/or the image processing device 120.

In some embodiments, the terminal device 140 may enable an interaction between a user and the image processing device 120. For example, an administrator or an employee of a security company may transmit an instruction to the image displaying system 100 via the terminal device 140 to jointly display an image (or a video) and a map indicating the physical location of the scene included in the image (or the video). Additionally or alternatively, the administrator or the employee may submit a request to the image displaying system 100 via the terminal device 140 to search or track a target object in the image (or the video).

The terminal device 140 may include a mobile computing device 141, a tablet computer 142, a laptop computer 143, a smart home device (not shown), a desktop computer (now shown) or the like, or any combination thereof. In some embodiments, the mobile computing device 141 may include a wearable device, a mobile phone, a virtual reality device, an augmented reality device, a personal digital assistance (PDA), a navigation device, or the like, or any combination thereof.

In some embodiments, the image displaying system 100 may implement a surveillance system. The source images generated by the plurality of cameras 110 may be in the form of video streams. The images displayed by the image processing device 120 may be a panoramic video stream. The process provided in the present disclosure may reduce the time cost for generating the panoramic video stream and improve the real-time performance, so as to fulfill the requirement for providing a surveillance service. The image displaying system 100 may also be adopt in other related fields, such as photography, movie production, journalism, medical imaging, etc.

In some embodiments, the image displaying system 100 may only include one movable camera for generating the source images. The movable camera may move along a preset moving trajectory, and capture an image at each preset shooting location along the preset moving trajectory. The obtained images may serve as the source images for further processing.

In some embodiments, each preset shooting location along the preset moving trajectory may be associated with one or more preset imaging parameter, such as a shooting angle. When the movable camera moves to a preset shooting location, the camera may adopt the one or more preset imaging parameters associated with the preset shooting location to capture the corresponding source image.

For demonstration purposes, the present disclosure may be described on the premise that the source images are generate by a preset number of cameras. However, it is understood that, the source images may also be generated by a reduced number of cameras (including one or more movable camera), or even only one movable camera.

It is noted that above descriptions about the image displaying system 100 are merely for illustration purposes, and not intended to limit the scope of the present disclosure. It is understood that, after learning the major concept and the mechanism of the present disclosure, a person of ordinary skills in the art may alter the image displaying system 100 in an uncreative manner. The alteration may include combining and/or splitting certain devices/components/modules/units, adding or removing optional devices/components/modules/units, changing the connection state of the devices/components/modules/units, applying the image displaying system 100 in a relative field, or the like, or any combination thereof. All such modifications are within the scope of the present disclosure.

FIG. 2 is a schematic diagram illustrating exemplary hardware and/or software components of an exemplary computing device according to some embodiments of the present disclosure. For example, the computing device 200 may be the image processing device 120, and/or an electronic device specialized in video or image processing. As illustrated in FIG. 2, the computing device 200 may include a processor 222, a storage 227, an input/output (I/O) 226, and a communication port 225.

The processor 222 (e.g., logic circuits) may execute computer instructions (e.g., program code) and perform functions in accordance with techniques described herein. For example, the processor 222 may include interface circuits and processing circuits therein. The interface circuits may be configured to receive electronic signals from a bus (not shown in FIG. 2), wherein the electronic signals encode structured data and/or instructions for the processing circuits to process. The processing circuits may conduct logical operations calculations, and then determine a conclusion, a result, and/or an instruction encoded as electronic signals. Then the interface circuits may send out the electronic signals from the processing circuits via the bus.

The computer instructions may include, for example, routines, programs, objects, components, data structures, procedures, modules, and functions, which perform particular functions described herein. In some embodiments, the processor 222 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method operations that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 20 (e.g., a first processor executes operation A and a second processor executes operation B, or the first and second processors jointly execute operations A and B).

The storage 227 may store data/information obtained from the plurality of cameras 110, the image processing device 120, the terminal device 140, the network 130, the storage device 150, and/or any other component of the image displaying system 100. In some embodiments, the storage 227 may include a mass storage, removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random-access memory (RAM), which may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 227 may store one or more programs and/or instructions to perform exemplary methods described in the present disclosure.

The I/O 226 may input and/or output signals, data, information, etc. In some embodiments, the I/O 226 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 225 may be connected to a network (e.g., the network 130) to facilitate data communications. The communication port 225 may establish connections between the plurality of cameras 110, the image processing device 120, the terminal device 140, the network 130, the storage device 150, and/or any other component of the image displaying system 100. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or a combination thereof. In some embodiments, the communication port 225 may be and/or include a standardized communication port, such as RS232, RS485, etc. In some embodiments, the communication port 225 may be a specially designed communication port.

Figure 3:
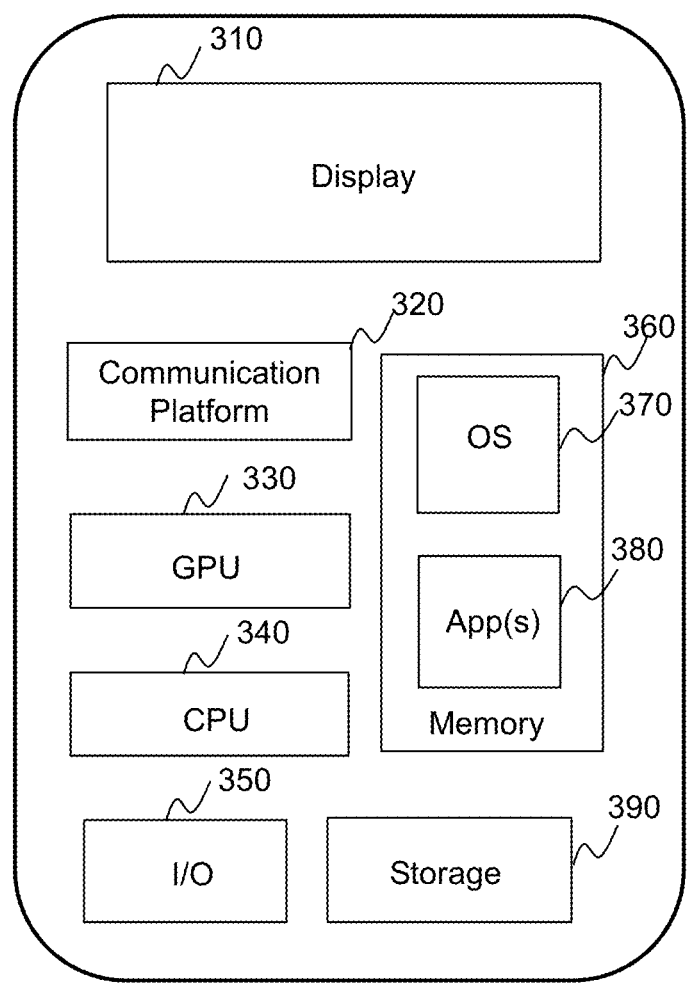
FIG. 3 is a schematic diagram illustrating exemplary components of an exemplary user device according to some embodiments of the present disclosure.

FIG. 3 is a schematic diagram illustrating exemplary components of an exemplary user device according to some embodiments of the present disclosure. As illustrated in FIG. 3, the user device 300 may include a communication platform 320, a display 310, a graphic processing unit (GPU) 330, a central processing unit (CPU) 340, an I/O port 350, a memory 360, and a storage 390. In some embodiments, any other suitable component, including but not limited to a system bus or a controller (not shown), may also be included in the user device 300. In some embodiments, a mobile operating system 370 (e.g., iOS™, Android™, Windows Phone™) and one or more applications 380 may be loaded into the memory 360 from the storage 390 in order to be executed by the processor 340. The user device 300 may be an embodiment of the terminal device 140.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
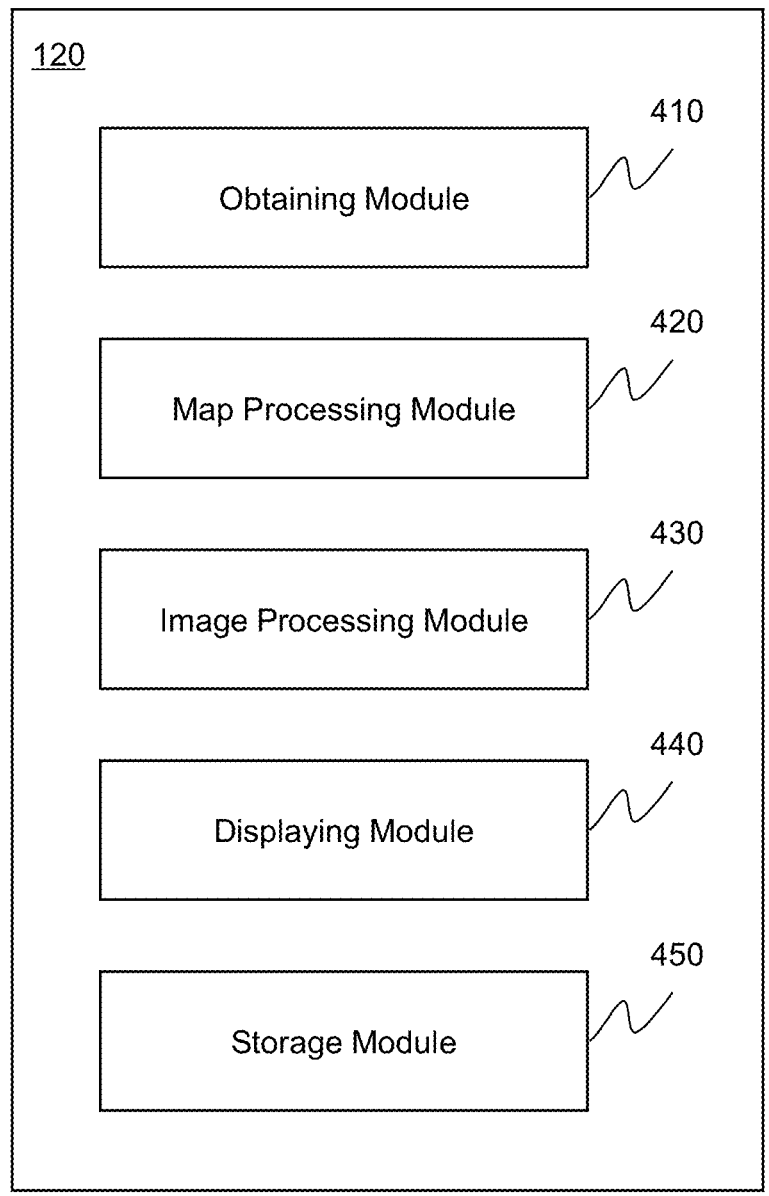
FIG. 4 is a block diagram of an exemplary image processing device according to some embodiments of the present disclosure.

FIG. 4 is a block diagram of an exemplary image processing device 120 according to some embodiments of the present disclosure. The image processing device 120 may include an obtaining module 410, a map processing module 420, an image processing module 430, a displaying module 440 and a storage module 450. The image processing device 120 may include more or fewer components without loss of generality. For example, two of the modules may be combined into a single module, or one of the modules may be divided into two or more modules. As another example, one or more of the modules may reside on different computing devices (e.g., a desktop, a laptop, a mobile device, a tablet computer, a wearable computing device, or the like, or a combination thereof). As still another example, the image processing device 120 may be implemented on the computing device 200 shown in FIG. 2.

Here and also throughout the present disclosure, a module may be implemented in many different ways and as hardware, software or in different combinations of hardware and software. For example, all or parts of a module implementations may be a processing circuitry that may include part or all of an instruction processor, such as a central processing unit (CPU), a microcontroller, a microprocessor; or an application specific integrated circuit (ASIC), a digital signal processor (DSP), a digital signal processing device (DSPD), a programmable logic device (PLD), a field programmable gate array (FPGA), a controller, other electronic components; or as circuitry that includes discrete logic or other circuit components, including an analog circuit component, a digital circuit component or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

The obtaining module 410 may obtain information and/or data related to image display. For example, the obtaining module 410) may obtain an image captured by a camera from a shooting direction. The image may include a target in the surrounding environment of the camera. The target may be any object (e.g., a building, a tree, a street, a river, or the like) that is viewable by the camera from the shooting direction. Further, the obtaining module 410 may obtain a map of the surrounding environment of the camera. In some embodiments, the map may be a planimetric map that shows the surrounding environment of the camera in a two-dimensional (2D) manner.

In some embodiments, the obtaining module 410 may transmit the image and/or the map to other modules of the image processing device 120 for further processing. For example, the obtaining module 410 may transmit the map to the map processing module 420 for projecting a content of the map onto a first imaging surface to form a first projected image. As another example, the obtaining module 410 may transmit the image to the image processing module 430 for projecting a content of the image onto a second imaging surface to form a second projected image. As still another example, the obtaining module 410 may transmit the image and/or the map to the storage module 450 for store in a local database or a remote database.

The map processing module 420 may be configured to project a content of a map onto a first imaging surface to form a first projected image. The first projected image on the first imaging surface may be regarded as a representation of the map. In some embodiments, the map processing module 420 may generate the first projected image according to a first projection relationship associated with the map. The first projection relationship associated with the map may indicate a point to point relationship between the points (or pixels) of the map and the points (or pixels) of the first projected image. In some embodiments, the map processing module 420 may determine the first projection relationship according to displaying parameters of the map. The displaying parameters of the map may include a first rotation angle of the map, a pitch angle of the map, a zooming scale of the map and a vertical shift of the map, etc.

The image processing module 430 may be configured to project a content of an image onto a second imaging surface to form a second projected image. The second projected image on the second imaging surface may be regarded as a representation of the image. In some embodiments, the second imaging surface may include a cylindrical surface. In some embodiments, the image processing module 430 may generate the second projected image according to a second projection relationship associated with the image. The second projection relationship associated with the image may indicate a point to point relationship between the points (or pixels) of the image and the points (or pixels) of the second projected image. In some embodiments, the image processing module 430 may determine the second projection relationship according to displaying parameters of the image. The displaying parameters of the image may include a second rotation angle of the image, a pitch angle of the image, a zooming scale of the image, a vertical shift of the image, a radius of the cylinder, etc.

The displaying module 440 may be configured to jointly display at least one image and a map. The joint display of the at least one image and the map may denote that the content of the at least one image and the content of the map may be simultaneously displayed. In some embodiments, the display module 440 may include different imaging surfaces. The content of the at least one image and the content of the map may be displayed on the different imaging surfaces, respectively. Exemplary imaging surfaces may include a plane imaging surface, a cylindrical imaging surface, a spherical imaging surface, or the like, or a combination thereof.

In some embodiments, in the joint display, the representation of the at least one image on the cylindrical imaging surface may match with the representation of the map on the plane imaging surface. For example, the positon information of the scene included in the at least one image may be indicated by the representation of the map in the joint display.

The storage module 450 may be configured to store data, instructions, and/or any other information related to the image display. For example, the storage module 450 may store the image, the map, the displaying parameters of the image, the displaying parameters of the map, or the like, or any combination thereof. In some embodiments, the storage module 450 may store data obtained from other components of the image processing device 120, and/or the camera 110. In some embodiments, the storage module 450 may store data and/or instructions that the image processing device 120 may execute or use to perform exemplary methods described in the present disclosure. In some embodiments, the storage module 450 may include a mass storage, a removable storage, a volatile read-and-write memory, a read-only memory (ROM), or the like, or a combination thereof. In some embodiments, the storage module 450 may be implemented on a cloud platform as described elsewhere in the disclosure. In some embodiments, the storage module 450 may be connected to and/or communicate with one or more other components in the image processing device 120. One or more components in the image processing device 120 may access the data or instructions stored in the storage module 450.

It should be noted that the above description of image processing device 120 is merely provided for the purposes of illustration, and not intended to be understood as the only embodiment. For persons having ordinary skills in the art, various variations and modifications may be conduct under the teaching of some embodiments of the present disclosure. However, those variations and modifications may not depart from the protecting of some embodiments of the present disclosure.

Figure 5:
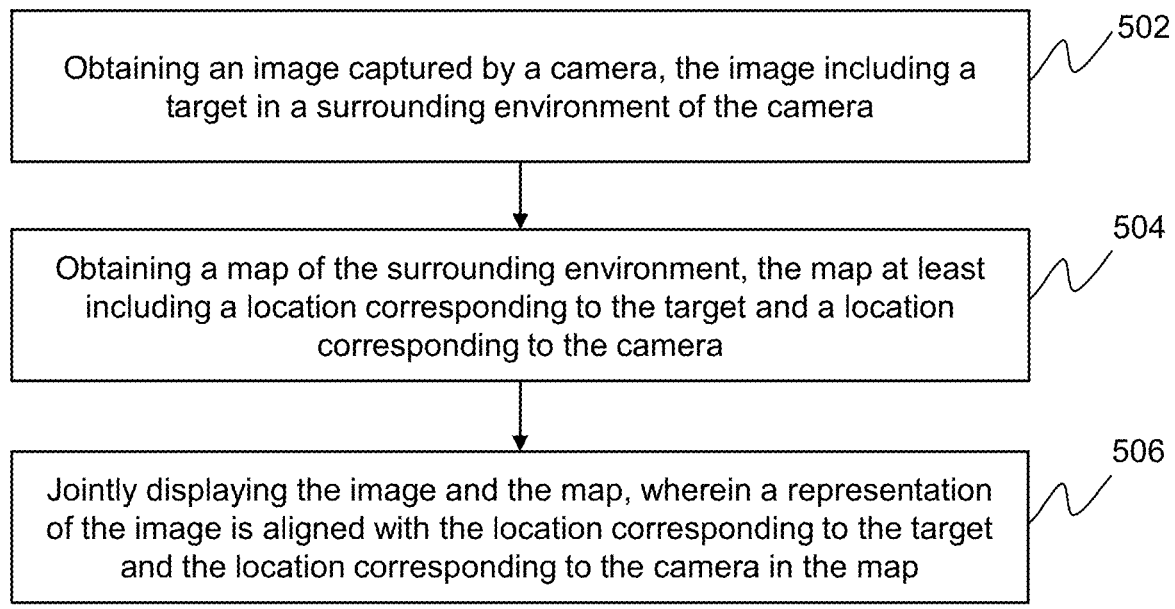
FIG. 5 is a flow chart illustrating an exemplary process for jointly displaying a map and an image according to some embodiments of the present disclosure.

FIG. 5 is a flow chart illustrating an exemplary process 500 for jointly displaying a map and an image according to some embodiments of the present disclosure. In some embodiments, the process 500 may be implemented on the image displaying system 100 as illustrated in FIG. 1. For example, the process 500 may be stored in a storage medium (e.g., the storage device 150, or the storage 227 of the computing device 200) as a form of instructions, and invoked and/or executed by the image processing device 120. The operations in the process 500 presented below are intended to be illustrative. In some embodiments, the process 500 may be accomplished with one or more additional operations not described, and/or without one or more of the operations discussed. Additionally, the order of the operations of the process 500 as illustrated in FIG. 5 and described below may not be intended to be limiting. It shall be noted that, although the joint display of a map and an image is described as an example, the joint display of a map and multiple images may be similarly achieved according to a similar process as the process 500.

In 502, the image processing device 120 (e.g., the obtaining module 410) may obtain an image captured by a camera from a shooting direction. The image may include a target in the surrounding environment of the camera. The target may be any object (e.g., a building, a tree, a street, a river, or the like) that is viewable by the camera from the shooting direction. The shooting direction may refer to the direction to which the lens of the camera is facing. In some embodiments, the image may be stored after being captured by the camera, and the image processing device 120 may obtain the image from a storage device (e.g., the storage device 150, the storage 227, or the storage 390). In some embodiments, the image may be sent to the image processing device 120 for processing immediately after being captured by the camera.

In some embodiments, the camera may be one of the plurality of cameras 110 that are installed at different locations (e.g., a plurality of locations that are substantially distributed along a circle). Each of the plurality of cameras 110 may correspond to a fixed shooting direction and capture images from that fixed shooting direction. In some embodiments, the scenes included in two images captured by two neighboring cameras 110 may have an overlap region. To better display the two images in a joint manner, the overlapped region in the two images may be removed according to one or more algorithms.

In some embodiments, the camera may be a movable camera with a plurality of preset shooting directions. The camera may capture images from each of the preset shooting directions.

In 504, the image processing device 120 (e.g., the obtaining module 410) may obtain a map of the surrounding environment of the camera. The map may at least include a location corresponding to the target and a location corresponding to the camera.

For example, assuming that the target in the image is a landmark building in the surrounding environment of the camera, the representation of the landmark building in the map may be a certain region with a similar shape, a similar color, or a similar texture as the landmark building. The location corresponding to the target may be identified at the certain region.

As another example, assuming that the camera can be hardly recognized in the map, the location corresponding to the camera may be the location of a reference object related to the camera in the map. The reference object may be a structure where the camera is installed, a road where the camera is located, or the like. For example, assuming that the camera is installed on the roof of a white building, the location corresponding to the camera may be identified at the location of the representation of the white building in the map.

In some embodiments, the map may be a planimetric map that shows the surrounding environment of the camera in a two-dimensional (2D) manner. Exemplary planimetric map may include a satellite map, an aerial image, or the like, or a combination thereof. The satellite map may be collected by imaging satellites operated by governments and businesses (e.g., Apple Maps, Google Maps) around the world. The aerial image may be an image taken from an aircraft or other flying objects. Exemplary flying objects may include fixed-wing aircrafts, helicopters, unmanned aerial vehicles (UAVs or "drones"), balloons, blimps and dirigibles, rockets, pigeons, kites, parachutes, stand-alone telescoping, or the like, or any combination thereof. In some embodiments, the map may be a stereoscopic map that shows the surrounding environment of the camera in a three-dimensional (3D) manner.

In some embodiments, information related to the map may be pre-stored in a storage (e.g., the storage device 150, the storage 227 of the computing device 228, the storage 390), and the image processing device 120 may obtain the map from a storage device. Detailed descriptions regarding the information related to the map may be found elsewhere in the present disclosure (e.g., in FIG. 10, and the descriptions thereof).

In 506, the image processing device 120 (e.g., the displaying module 440) may jointly display the image and the map. The joint display of the image and the map may denote that the content of the image and the content of the map may be simultaneously displayed.

In some embodiments, the display module 440 may include different imaging surfaces. The content of the image and the content of the map may be displayed on the different imaging surfaces, respectively. Exemplary imaging surfaces may include a plane imaging surface, a cylindrical imaging surface, a spherical imaging surface, or the like, or a combination thereof. For example, the display module 440 may project the content of the map on to a plane imaging surface to form a representation of the map (e.g., a first projected image), and project the content of the image onto a cylindrical imaging surface to form a representation of the image (e.g., a second projected image).

In the joint display, the representation of the image on the cylindrical imaging surface may match with the representation of the map on the plane imaging surface. For example, with the display of the representation of the image on the cylindrical imaging surface, the positon information of the scene included in the image may be simultaneously presented by the map. Specifically, the representation of the image may be aligned with the location corresponding to the target and the location corresponding to the camera in the map, which means that the representation of the image on the cylindrical imaging surface may be orthogonal or substantially orthogonal to a line that connects the location corresponding to the target and the location corresponding to the camera in the map. As used herein, that a surface is substantially orthogonal to a line may denote that the line and the surface may form an included angle varying from 90 degrees by a variance. The variance may be a value between 0 degree to 30 degrees, such as, 1 degree, 2 degrees, 5 degrees, 8 degrees, 10 degrees, 15 degrees, 20 degrees, 25 degrees, 28 degrees, etc. In some embodiments, when facing to the representation of the image on the cylindrical imaging surface, a user may easily identify the position of the scene included in the image in the map as it is roughly in the same perspective of the user. Detailed descriptions regarding the displaying of the image and the map may be found elsewhere in the present disclosure (e.g., in FIG. 6, and the descriptions thereof).

It should be noted that the above description of process 500 is merely provided for the purposes of illustration, and not intended to be understood as the only embodiment. For persons having ordinary skills in the art, various variations and modifications may be conduct under the teaching of some embodiments of the present disclosure. In some embodiments, some operations may be reduced or added. However, those variations and modifications may not depart from the protecting of some embodiments of the present disclosure. For example, one or more other optional operations (e.g., a storing operation) may be added in the exemplary process 500. In the storing operation, the image processing device 120 may store one or more intermediate result in any storage device (e.g., the storage device 150, or the storage 227) disclosed elsewhere in the present disclosure. As another example, a plurality of images captured by the plurality of cameras 110 may be jointly displayed with the map in a similar manner with the process 500.

Figure 6:
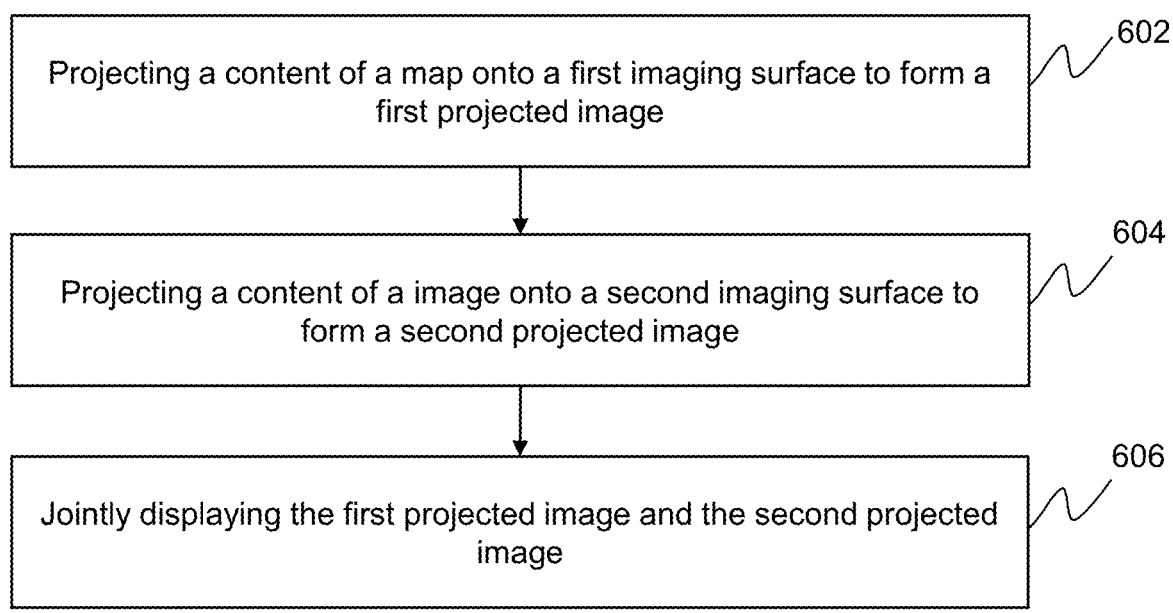
FIG. 6 is a flow chart illustrating an exemplary process for jointly displaying a map and an image according to some embodiments of the present disclosure.

FIG. 6 is a flow chart illustrating an exemplary process 600 for jointly displaying a map and an image according to some embodiments of the present disclosure. In some embodiments, the process 600 may be implemented on the image displaying system 100 as illustrated in FIG. 1. For example, the process 600 may be stored in a storage medium (e.g., the storage device 150, or the storage 227) as a form of instructions, and invoked and/or executed by the image processing device 120. The operations in the process 600 presented below are intended to be illustrative. In some embodiments, the process 600 may be accomplished with one or more additional operations not described, and/or without one or more of the operations discussed. Additionally, the order of the operations of the process 600 as illustrated in FIG. 6 and described below may not be intended to be limiting. In some embodiments, the operation 506 may be performed according to the process 600.

In 602, the image processing device 120 (e.g., the map processing module 420) may project a content of the map onto a first imaging surface to form a first projected image. The first projected image on the first imaging surface may be regarded as a representation of the map.

For illustration purpose, the first imaging surface may be a plane surface and the first projected image may be a 2D image. The image processing device 120 may generate the first projected image according to a first projection relationship associated with the map. The first projection relationship associated with the map may indicate a point to point relationship between the points (or pixels) of the map and the points (or pixels) of the first projected image. In some embodiments, the first projection relationship may be expressed as:

$$x_{map} = y_{map}*zoom*\cos(pitch)*\sin(yaw) + x_{output}*zoom*\cos(yaw) \quad (1)$$

$$y_{map} = y_{output}*zoom*\cos(pitch)*\cos(yaw) - x_{output}*zoom*\sin(yaw) + ty_{map} \quad (2)$$

where $(x_{map}, y_{map})$ denotes the coordinate of a pixel in the map, $(x_{output}, y_{output})$ denotes the coordinate of a corresponding pixel in the first projected image, yaw denotes a first rotation angle of the map (also referred to as the course angle of the map), pitch denotes a pitch angle of the map, zoom denotes a zooming scale of the map, and $ty_{map}$ denotes a vertical shift coefficient of the map. The first rotation angle of the map may relate to the rotation angle of the map on the plane imaging surface (i.e., the first projected image) with respect to the axis passing through the center of the map and orthogonal to the plane imaging surface. With different first rotation angles, the map on the plane imaging surface may be oriented to different directions. For example, the map may be a north orientation map with north oriented towards the top of the map, or a south orientation map with south oriented towards the top of the map. The pitch angle of the map may relate to the angle between a perspective of a viewer and the plane of the plane imaging surface. The zooming scale of the map may be a first scale associated with the zooming effect of the map on the plane imaging surface. With different zooming scales of the map, a viewer can view the map on the plane imaging surface with different FOVs. For example, an operation of zooming in on the map on the plane imaging surface (e.g., by a user) may be achieved by increasing the value of the zooming scale of the map. An operation of zooming out on the map on the plane imaging surface (e.g., by a user) may be achieved by decreasing the value of the zooming scale of the map. The vertical shift coefficient of the map may relate to the shift amount of the map in the vertical direction. For example, in the case when a user is looking down towards the first projected image, a closer looking at the first projected image may be achieved by increasing the vertical shift coefficient of the map.

Based on the Equations (1) and (2), the image processing device 120 may project the map onto the plane imaging surface to form the first projected image. For brevity, the first rotation angle of the map, the pitch angle of the map, the zooming scale of the map and the vertical shift of the map may be referred to as displaying parameters of the map. In some embodiments, the image processing device 120 may retrieve the information of the map (e.g., the coordinates of the pixels in the map) from a storage (e.g., the storage device 150, or the storage 227) and calculate the information of the first projected image on the plane imaging surface (e.g., the coordinates of the pixels in the first projected image) based on the information of the map and the displaying parameters of the map as described above. In some embodiments, the image processing device 120 may adjust one or more displaying parameters of the map according to a user command. For example, if a user sends a command to display finer structure information of the map on the plane imaging surface, the image processing device 120 may increase the value of the zooming scale of the map. If a user sends a command to change the orientation of the map on the plane imaging surface, the image processing device 120 may adjust the first rotation angle of the map. In some embodiments, the user command may be sent by the user via an I/O interface of the image processing device 120. For example, the user command may be performed by a click operation by a mouse, a rolling operation of the mouse wheel, a touch operation by a finger, or the like, or a combination thereof.

In some embodiments, the point to point relationship between the points (or pixels) of the map and the points (or pixels) of the first projected image may be calculated in advance and stored in a storage device (e.g., the storage module 450) in the form of a mapping table. When needed, the image processing device 120 may retrieve the mapping table from the storage device and generate the first projected image based on the mapping table. Alternatively, the image processing device 120 may project the content of the map onto the plane imaging surface to form the first projected image after the map is obtained by the obtaining module 410 as described in operation 504.

In 604, the image processing device 120 (e.g., the image processing module 430) may project a content of the image onto a second imaging surface to form a second projected image. The second projected image on the second imaging surface may be regarded as a representation of the image.

For illustration purpose, the second imaging surface may include a cylindrical surface. The image processing device 120 may generate the second projected image according to a second projection relationship associated with the image. The second projection relationship associated with the image may indicate a point to point relationship between the points (or pixels) of the image and the points (or pixels) of the second projected image.

In some embodiments, the second projection relationship may indicate a projection of each point (or pixel) in the image into the world coordinate. The world coordinates of a pixel in the image may be expressed as:

$$x_w = \frac{\sin\left(\frac{x_{input}}{r_{pano}} + yaw_{pano}\right) * r_{pano} * w}{zoom_{pano}}, \quad (3)$$

$$y_w = \frac{-\left(\cos\left(\frac{x_{input}}{r_{pano}} + yaw_{pano}\right) * r_{pano} - r_{pano} * zoom_{pano} + h * zoom_{pano}\right) *}{zoom_{pano}} \quad (4)$$

$$z_w = \frac{\left(\cos\left(\frac{x_{input}}{r_{pano}} + yaw_{pano}\right) * r_{pano} - r_{pano} * zoom_{pano}\right) *}{zoom_{pano}} + r_{pano}, \quad (5)$$

where ($x_{input}$, $y_{input}$) denotes the coordinate of a pixel in the image, ($x_w$, $y_w$, $z_w$) denotes the coordinate of the pixel in the world coordinate, h denotes the height of the image, w denotes the width of the image, $yaw_{pano}$ denotes a second rotation angle of the image (also referred to as the course angle of the image), $pitch_{pano}$ denotes a pitch angle of the image, $zoom_{pano}$ denotes a zooming scale of the image, $ty_{pano}$ denotes a vertical shift coefficient of the image, and $r_{pano}$ denotes a radius of the cylinder (i.e., the cylindrical imaging surface) associated with the second projected image. The second rotation angle of the image may relate to the rotation angle of the image on the cylindrical imaging surface (i.e., the second projected image) along the axis of the cylinder. In some embodiments, the second projection image may be displayed on a region of the cylindrical imaging surface, and the second rotation angle may have an effect on the position of the display region on the cylindrical imaging surface. The pitch angle of the image may relate to the angle between a perspective of a viewer and the plane of the plane imaging surface. The zooming scale of the image may be a second scale associated with the zooming effect of the image on the cylindrical imaging surface. With different zooming scales of the image, a viewer can view the image on the cylindrical imaging surface with different FOVs. For example, an operation of zooming in on the image on the cylindrical imaging surface (e.g., by a user) may be achieved by increasing the value of the zooming scale of the image. An operation of zooming out on the image on the cylindrical imaging surface (e.g., by a user) may be achieved by decreasing the value of the zooming scale of the image. The vertical shift coefficient of the image may relate to the shift amount of the image in the vertical direction. For example, in the case when a user is looking down towards the second projected image, a closer looking at the second projected image may be achieved by increasing the vertical shift coefficient of the image.

The image processing device 120 may further determine the second projected image based on the world coordinates of the points (or pixels) of the image. A pixel in the second projected image may be expressed as:

$$x_{output} = \frac{x_w}{z_w}, \quad (6)$$

$$y_{output} = \frac{y_w}{z_w} + ty_{pano}, \quad (7)$$

where ($x_{output}$, $y_{output}$) denotes the coordinate of the corresponding pixel in the second projected image.

Based on the Equations (3) to (7), the image processing device 120 may project the image onto the cylindrical imaging surface to form the second projected image. For brevity, the second rotation angle of the image, the pitch angle of the image, the zooming scale of the image, the vertical shift of the image and the radius of the cylinder may be referred to as displaying parameters of the image. In some embodiments, the image processing device 120 may retrieve the information of the image (e.g., the coordinates of the pixels in the image) from a storage (e.g., the storage device 150, or the storage 227) and calculate the information of the second projected image on the cylindrical imaging surface (e.g., the coordinates of the pixels in the second projected image) based on the information of the image and the displaying parameters of the image as described above. In some embodiments, the image processing device 120 may adjust one or more displaying parameters of the image according to a user command. For example, if a user sends a command to display finer structure information of the image on the cylindrical imaging surface, the image processing device 120 may increase the value of the zooming scale of the image. If a user sends a command to change the display region of the image on the cylindrical imaging surface, the image processing device 120 may adjust the second rotation angle of the image. In some embodiments, the user command may be sent by the user via an I/O interface of the image processing device 120. For example, the user command may be performed by a click operation by a mouse, a rolling operation of the mouse wheel, a touch operation by a finger, or the like, or a combination thereof.

In some embodiments, similar to the projection of the image on the cylindrical imaging surface, the image processing device 120 may simultaneously project multiple images to generate multiple second projected images on the cylindrical imaging surface, and if needed, stitch all the second projected images together to form a combined projected image. The multiple images may be captured by a plurality of cameras (e.g., the plurality of cameras 110) installed at different locations with different shooting angles as described elsewhere in the present disclosure. Alternatively, the image processing device 120 may simultaneously project only a portion of the multiple images captured by the plurality of cameras at a time according to, for example, a user input.

In 606, the image processing device 120 (e.g., the displaying module 440) may jointly display the first projected image and the second projected image.

In some embodiments, the image processing device 120 may coordinate the displaying parameters of the map with the displaying parameters of the image such that the second projected image aligns with the map as described in operation 506. For example, in the case that the map is a north orientation map (i.e., a map with north oriented towards the top of the map) and the camera which captures the image has the shooting direction pointing to the north, the first rotation angle of the map and the second rotation angle of the image may be set to have the same value, and thus the second projected image may align with the north direction in the map. In the case that the map is a north orientation map and the camera which captures the image has the shooting direction pointing to the east, the first rotation angle of the map and the second rotation angle of the image may be set to have a difference of 90 degrees, and thus the second projected image may align with the east direction in the map.

In some embodiments, the image processing device 120 may jointly rotate and/or scale the first projected image and the second projected image to perform a rotating operation and/or a zooming operation on the joint display according to an instruction of a user. For example, the image processing device 120 may jointly rotate the first projected image and the second projected image by changing the values of both the first rotation angle of the map and the second rotation angle of the image. Detailed descriptions regarding the rotation of the joint display may be found elsewhere in the present disclosure (e.g., in FIG. 7, and the descriptions thereof). For another example, the image processing device 120 may jointly zoom in and zoom out the first projected image and the second projected image by changing the values of both the first scale associated with the map and the second scale associated with the image. Detailed descriptions regarding the zooming effect of the joint display may be found elsewhere in the present disclosure (e.g., in FIG. 8, and the descriptions thereof).

Figure 9:
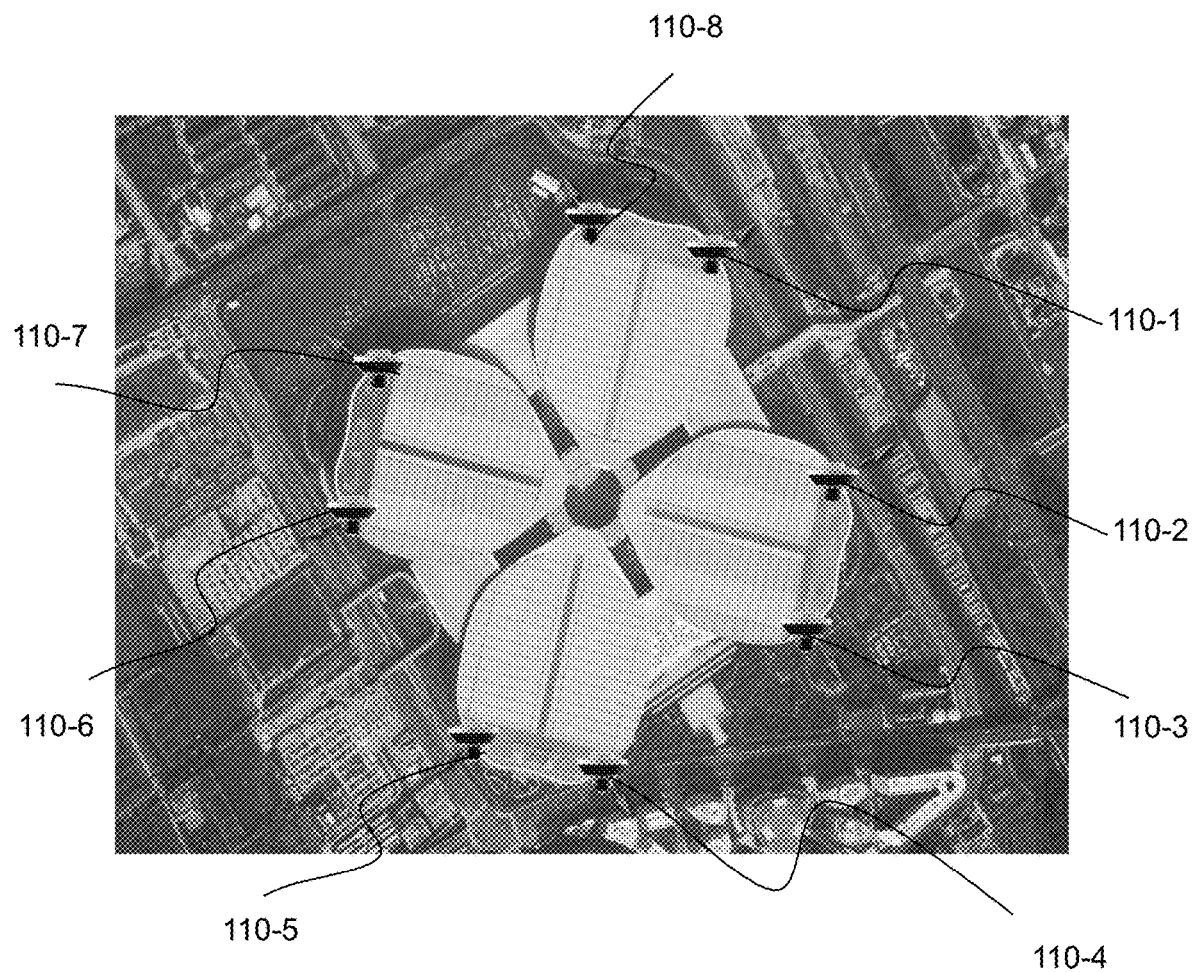
FIG. 9 illustrates an exemplary arrangement of cameras according to some embodiments of the present disclosure.
Figure 11:
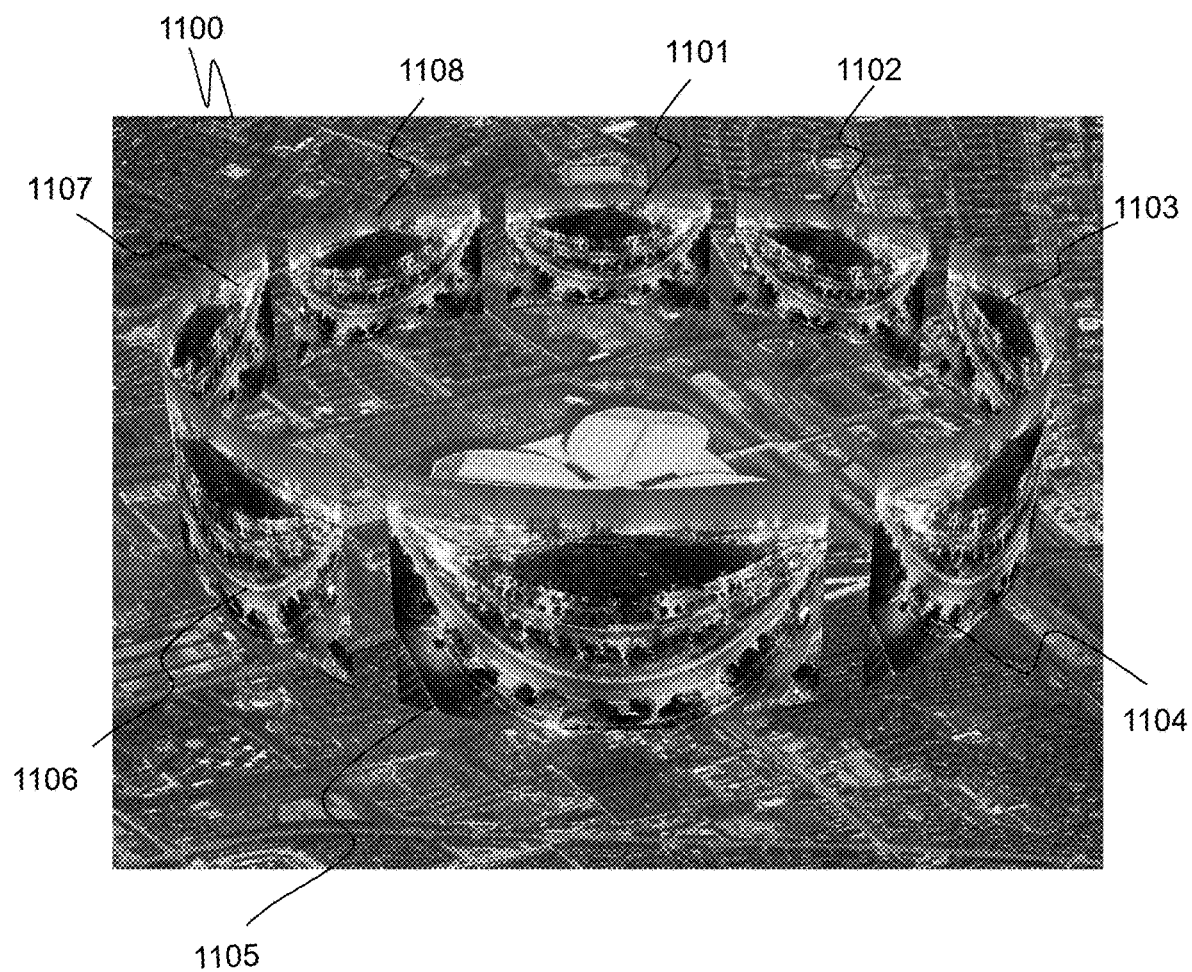
FIG. 11 illustrates an exemplary joint display of images and a map according to some embodiments of the present disclosure.

In some embodiments, the image processing device 120 project multiple images to form multiple second projected images and jointly displays the first projected image and the multiple second projected images. It shall be noted that due to different shooting angles associated with the multiple images, each of the multiple images may have a different second rotation angle. For brevity, N panoramic images captured by N cameras may be taken as an example. If the N cameras are evenly distributed along a circle, the second rotation angle of each panoramic image may also be evenly distributed within the range of 0 to 360 degrees. The angle interval between each two adjacent second rotation angles of two panoramic images may be equally set to be 360/N degrees. By doing so, the image processing device 120 may project each of the N panoramic images to a distinctive portion of the second imaging surface (e.g., a cylindrical surface) that corresponds to a distinctive course angle. For example, as illustrated in FIG. 9, eight cameras may capture eight panoramic images at a time. The image processing device 120 may set the second rotation angles of the eight panorama images to be 0° C., 45° C., 90° C., 135° C., 180° C., 225° C., 270° C., 315° C., respectively, to form a pseudo 3D on a cylindrical surface (as shown in FIG. 11). It shall be noted that the second rotation angles of the eight panorama images may be adjusted according to different application scenarios. Specifically, the second rotation angles can be set to any angles within the range of 0 to 360 degrees according to a user input.

It should be noted that the above description of process 600 is merely provided for the purposes of illustration, and not intended to be understood as the only embodiment. For persons having ordinary skills in the art, various variations and modifications may be conduct under the teaching of some embodiments of the present disclosure. In some embodiments, some operations may be reduced or added. However, those variations and modifications may not depart from the protecting of some embodiments of the present disclosure. For example, one or more other optional operations (e.g., a storing operation) may be added in the exemplary process 600. In the storing operation, the image processing device 120 may store the first projected image, the second projected image(s) in any storage device (e.g., the storage device 150, or the storage 227) disclosed elsewhere in the present disclosure.

Figure 7:
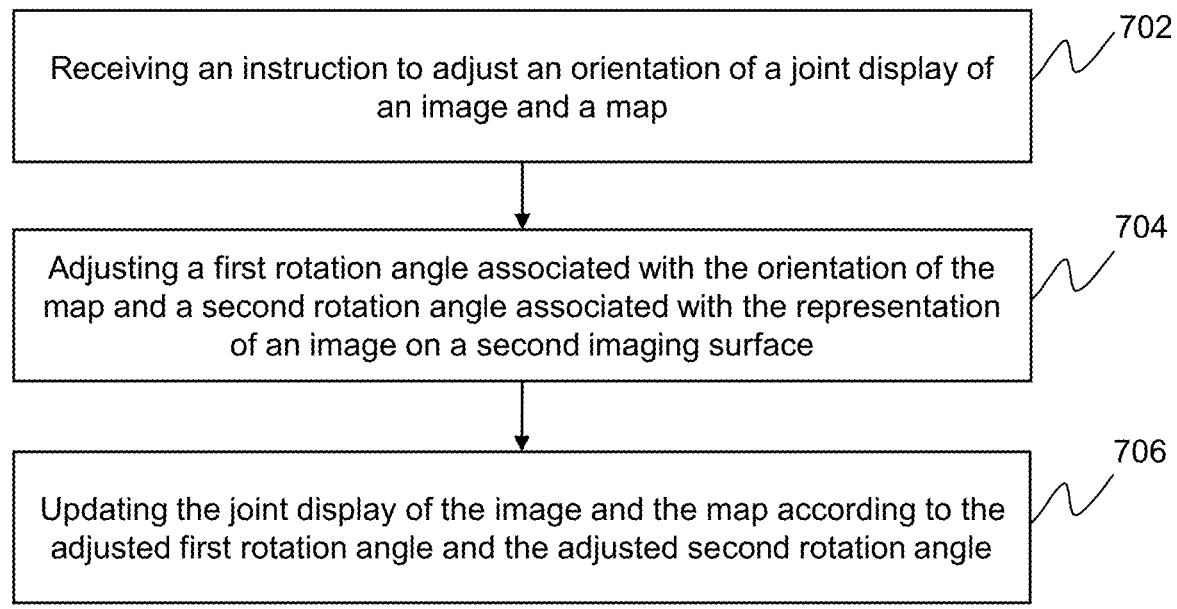
FIG. 7 is a flow chart illustrating an exemplary process for adjusting an orientation of a joint display according to some embodiments of the present disclosure.

FIG. 7 is a flow chart illustrating an exemplary process 700 for adjusting an orientation of a joint display according to some embodiments of the present disclosure. In some embodiments, the process 700 may be implemented on the image displaying system 100 as illustrated in FIG. 1. For example, the process 700 may be stored in a storage medium (e.g., the storage device 150, or the storage 227) as a form of instructions, and invoked and/or executed by the image processing device 120. The operations in the process 700 presented below are intended to be illustrative. In some embodiments, the process 700 may be accomplished with one or more additional operations not described, and/or without one or more of the operations discussed. Additionally, the order of the operations of the process 700 as illustrated in FIG. 7 and described below may not be intended to be limiting.

In 702, the image processing device 120 (e.g., the displaying module 440) may receive an instruction to adjust an orientation of the joint display of the image and the map.

In some embodiments, the image processing device 120 may receive the instruction from a mouse, a keyboard, a touch screen, a microphone, or the like, or any combination thereof. For example, a user may drag the joint display presented on a display device via the mouse or click a button on the keyboard to rotate the joint display. The orientation of the joint display to be adjusted may be determined by, for example, the direction of the movement of the mouse, the travelled distance of the mouse, the time duration of the button in a pressed state, the acceleration of the button being released or pressed, or the like, or a combination thereof.

As another example, the instruction may be in the form of a voice command. A user may give a voice command "switch to north". The image processing device 120 may parse and convert the command to a computer-recognizable instruction to change the joint display of the image and the map such that the image associated with a shooting direction pointing to the north may appear at a preset position of the second imaging surface. Alternatively, a user may give the voice command "rotate". Upon receiving the command, the image processing device 120 may generate the instruction to rotate the joint display in a preset angular velocity until another instruction to stop rotating is received. The preset angular velocity may be a default setting of the image displaying system 100, or may be adjustable under different situations. For example, the preset angular velocity may be adjusted according to a user input via, a click operation by a mouse, a rolling operation by a mouse wheel, or the like, or a combination thereof.

In 704, the image processing device 120 (e.g., the displaying module 440) may adjust the first rotation angle associated with the orientation of the map on the first imaging surface and the second rotation angle associated with the representation of the image on the second imaging surface. To achieve the adjustment, the image processing device 120 may determine an offset rotation angle based on the instruction. Further, the image processing device 120 may calculate a target rotation angle of the map by adding the offset rotation angle to the current first rotation angle of the map, and calculate a target rotation angle of the image by adding the offset rotation information to the current second rotation angle of the image.

In 706, the image processing device 120 (e.g., the displaying module 440) may update the joint display of the image and the map according to the adjusted first rotation angle and the adjusted second rotation angle. In some embodiments, the image processing device 120 may designate the target rotation angle of the map as the adjusted first rotation angle and designate the target rotation angle of the image as the adjusted second rotation angle. Then, the image processing device 120 may update the first projected image projected by the map according to the first projection relationship with the adjusted first rotation angle of the map, and update the second projected image projected by the image according to the second projection relationship with the adjusted second rotation angle.

It should be noted that the above description of process 700 is merely provided for the purposes of illustration, and not intended to be understood as the only embodiment. For persons having ordinary skills in the art, various variations and modifications may be conduct under the teaching of some embodiments of the present disclosure. In some embodiments, some operations may be reduced or added. However, those variations and modifications may not depart from the protecting of some embodiments of the present disclosure.

Figure 8:
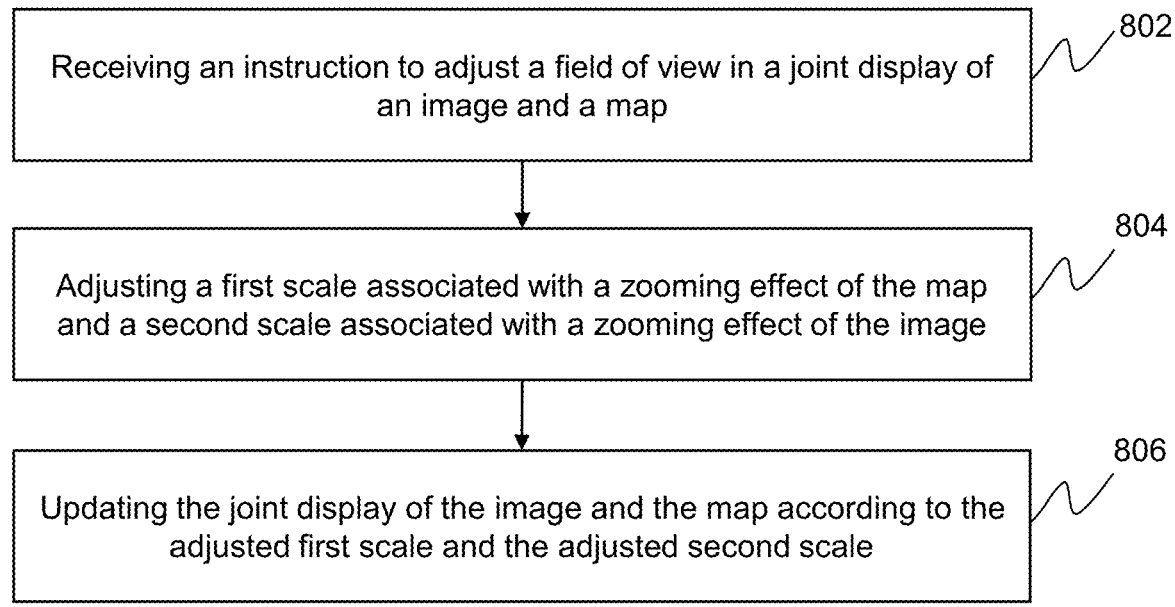
FIG. 8 is a flow chart illustrating an exemplary process for adjusting a field of view of a joint display according to some embodiments of the present disclosure.

FIG. 8 is a flow chart illustrating an exemplary process 800 for adjusting a field of view of a joint display according to some embodiments of the present disclosure. In some embodiments, the process 800 may be implemented on the image displaying system 100 as illustrated in FIG. 1. For example, the process 800 may be stored in a storage medium (e.g., the storage device 150, or the storage 227) as a form of instructions, and invoked and/or executed by the image processing device 120. The operations in the process 800 presented below are intended to be illustrative. In some embodiments, the process 800 may be accomplished with one or more additional operations not described, and/or without one or more of the operations discussed. Additionally, the order of the operations of the process 800 as illustrated in FIG. 8 and described below may not be intended to be limiting.

In 802, the image processing device 120 (e.g., the displaying module 440) may receive an instruction to adjust an FOV in the joint display of the image and the map. The FOV in the joint display of the image and the map may depend on a zooming effect of the image and the map. Similar to operation 702, the image processing device 120 may receive the instruction from a mouse, a keyboard, a touch screen, a microphone, or the like, or any combination thereof. For example, a user may zoom in or zoom out (i.e., widen or narrow the FOV) the joint display presented on a display device via the touch screen using a zooming gesture (e.g., a multi-touch gesture) preset and stored in one or more storage devices of the image displaying system 100 (e.g., the storage device 150) or click a button on the keyboard to zoom in or zoom out the joint display. Exemplary zooming gesture may include moving two fingers away from or close to each other on the touch screen.

In some embodiments, the adjustment of the FOV may be performed according to a center point. During the adjustment of the FOV, the position of the center point may remain unchanged on the first/second imaging surface. In some embodiments, the image processing device 120 may determine the center of a second projected image as the center point. In some embodiments, the image processing device 120 may determine a target based on the instruction and determine a point (or pixel) related to the target as the center point.

In 804, the image processing device 120 (e.g., the displaying module 440) may adjust the first scale associated with the zooming effect of the map and the second scale associated with the zooming effect of the image. In some embodiments, the image processing device 120 may determine an offset scale based on the instruction. Further, the image processing device 120 may calculate a target scale of the map by, for example, adding the offset scale to the first scale, and calculate a target scale of the image by, for example, adding the offset scale to the second scale.

In 806, the image processing device 120 (e.g., the displaying module 440) may update the joint display of the image and the map according to the adjusted first scale and the adjusted second scale. In some embodiments, the image processing device 120 may designate the target scale of the map as the adjusted first scale and designate the target scale of the image as the adjusted second scale. Then, the image processing device 120 may update the first projected image projected by the map according to the first projection relationship with the adjusted first scale, and update the second projected image projected by the image according to the second projection relationship with the adjusted second scale.

It should be noted that the above description of process 700 is merely provided for the purposes of illustration, and not intended to be understood as the only embodiment. For persons having ordinary skills in the art, various variations and modifications may be conduct under the teaching of some embodiments of the present disclosure. In some embodiments, some operations may be reduced or added. However, those variations and modifications may not depart from the protecting of some embodiments of the present disclosure. For example, instead of simultaneously zooming in or out the joint display of the map and the image, the image processing device 120 may control the zooming effect of the map and the image, separately. For example, the image processing device 120 may only perform the operation of zooming in or out the second projected image projected by the image on the second imaging surface, and keep the appearance of the first projected image projected by the map on the first imaging surface unchanged.

FIG. 9 illustrates an exemplary arrangement of cameras according to some embodiments of the present disclosure.

As shown in FIG. 9, eight cameras (110-1, 110-2, 110-3, 110-4, 110-5, 110-6, 110-7, and 110-8) are installed on the roof of a white building. The eight cameras may be substantially evenly arranged along a circle centered at the center of the white building. Each of the eight cameras has a distinctive shooting direction. For example, the camera 110-8 has s shooting direction oriented to the north (i.e., the top of the map). One or more images captured by the eight cameras may be projected to a cylindrical imaging surface, with a map (e.g., the map 1000 shown in FIG. 10) simultaneously projected to a plane imaging surface, to form the joint display of the map and the one or more images captured by the eight cameras.

Figure 10:
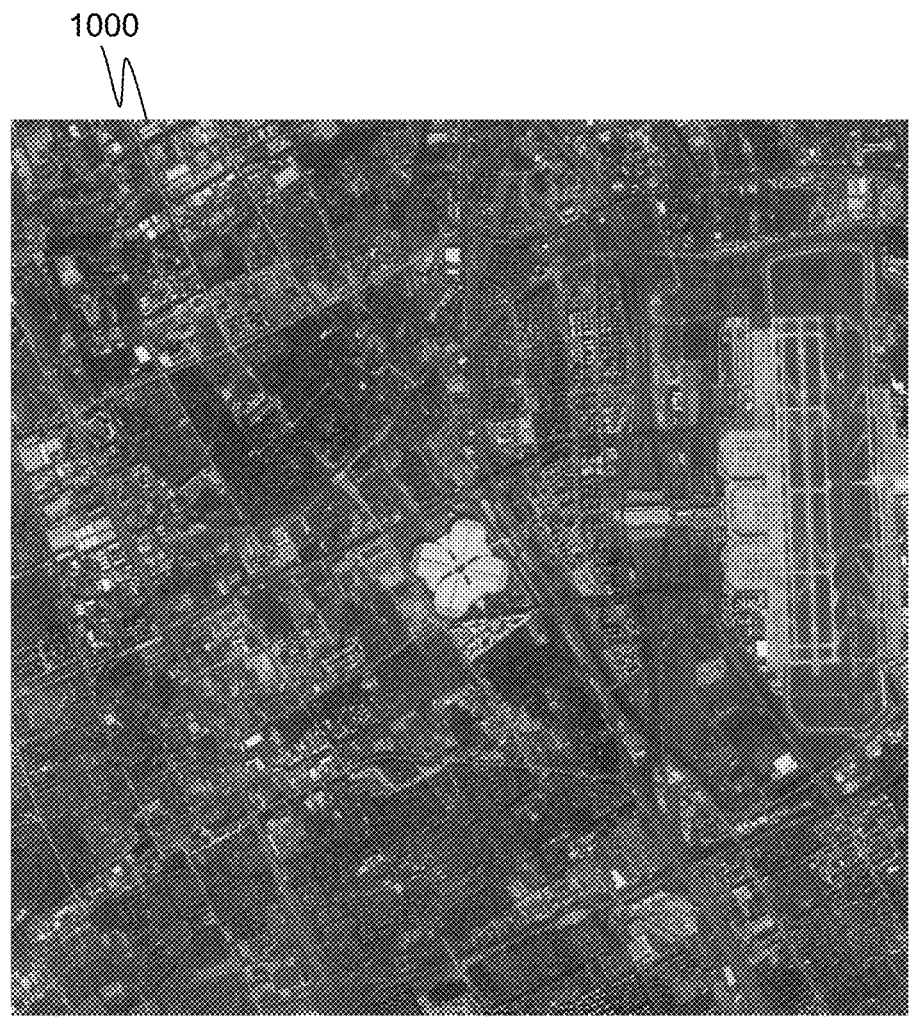
FIG. 10 illustrates an exemplary map of a surrounding environment of the building shown in FIG. 9 according to some embodiments of the present disclosure.

FIG. 10 illustrates an exemplary map 1000 of a surrounding environment of the white building illustrated in FIG. 9 according to some embodiments of the present disclosure. As shown in FIG. 10, the white building is located at the center of the map 1000. The map depicts the surrounding environment of the white building and the eight cameras which are too small to be identified. The map may at least depict the surrounding environment of the building within a predetermined distance. The predetermined distance may be a default setting of the image displaying system 100, or may be adjustable under different situations. For example, the predetermined distance may be adjusted according to a user input. In some embodiments, the distance may be 0.5 kilometers, 1 kilometer, 1.5 kilometers, 2 kilometers, 5 kilometers, 10 kilometers, 50 kilometers, 100 kilometers, etc.

As described elsewhere in the present disclosure, the map may be a satellite map, or an aerial image. The satellite map may be collected by imaging satellites operated by governments and businesses (e.g., Apple Maps, Google Maps) around the world. The aerial image may be an image taken from an aircraft or other flying objects. Exemplary flying objects may include fixed-wing aircrafts, helicopters, unmanned aerial vehicles (UAVs or "drones"), balloons, blimps and dirigibles, rockets, pigeons, kites, parachutes, stand-alone telescoping, or the like, or any combination thereof.

FIG. 11 illustrates an exemplary joint display of images and a map according to some embodiments of the present disclosure. The images may be taken by the eight cameras illustrated in FIG. 9, respectively. As shown in FIG. 11, eight projected images 1101, 1102, 1103, 1104, 1105, 1106, 1107, and 1108 are displayed on a cylindrical imaging surface. Each of the eight projected images may be generated by projecting an image captured by one of the eight cameras onto the cylindrical imaging surface. The map 1100, which may be viewed as the background, may be a projected image of the map 1000 illustrated in FIG. 10.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

We claim:

1. A system implemented on an image processing device, the image processing device comprising:
an obtaining module, a map processing module, an image processing module, a displaying module, and a storage module, wherein the storage module is configured to store data, instructions, or any other information related to image display, and the image processing device is directed to cause the system to:
obtain an image captured by a camera by the obtaining module, the image including a target in a surrounding environment of the camera;
obtain a map of the surrounding environment by the obtaining module, the map at least including a location corresponding to the target and a location corresponding to the camera; and
jointly display the image and the map by the displaying module, wherein a representation of the image is aligned with the location corresponding to the target and the location corresponding to the camera in the map, and to jointly display the image and the map, the image processing device is directed to:
project a content of the map onto a first imaging surface by the map processing module, to form a representation of the map, the map being transmitted to the map processing module by the obtaining module;
project a content of the image onto a second imaging surface by the image processing module, to form the representation of the image, the image being transmitted to the image processing module by the obtaining module; and
display the representation of the map and the representation of the image by the displaying module.

2. The system of claim 1, wherein the image captured by the camera is a panorama.

3. The system of claim 1, wherein the second imaging surface includes a cylindrical surface.

4. The system of claim 1, wherein the representation of the map is formed according to a first projection relationship associated with the map, and the representation of the image is formed according to a second projection relationship associated with the image.

5. The system of claim 4, wherein the first projection relationship includes a first rotation angle associated with an orientation of the map.

6. The system of claim 5, wherein the second projection relationship includes a second rotation angle associated with the representation of the image on the second imaging surface.

7. The system of claim 6, wherein the image processing device is further directed to cause the system to:
receive an instruction to adjust an orientation of the joint display of the image and the map;
adjust the first rotation angle associated with the orientation of the map and the second rotation angle associated with the representation of the image on the second imaging surface; and
update the joint display of the image and the map according to the adjusted first rotation angle and the adjusted second rotation angle.

8. The system of claim 4, wherein the first projection relationship includes a first scale associated with a zooming effect of the map.

9. The system of claim 8, wherein the second projection relationship includes a second scale associated with a zooming effect of the image.

10. The system of claim 9, wherein the image processing device is further directed to cause the system to:
receive an instruction to adjust a field of view in the joint display of the image and the map;
adjust the first scale associated with the zooming effect of the map and the second scale associated with the zooming effect of the image; and
update the joint display of the image and the map according to the adjusted first scale and the adjusted second scale.

11. A method implemented on a device having at least one storage medium including a set of instructions and at least one processor in communication with the at least one storage medium, the method comprising:
obtaining an image captured by a camera, the image including a target in a surrounding environment of the camera;
obtaining a map of the surrounding environment, the map at least including a location corresponding to the target and a location corresponding to the camera; and
jointly displaying the image and the map, wherein a representation of the image is aligned with the location corresponding to the target and the location corresponding to the camera in the map, wherein jointly displaying the image and the map includes:
projecting a content of the map onto a first imaging surface to form a representation of the map;
projecting a content of the image onto a second imaging surface to form the representation of the image; and
jointly displaying the representation of the map and the representation of the image.

12. The method of claim 11, wherein the representation of the map is formed according to a first projection relationship associated with the map, and the representation of the image is formed according to a second projection relationship associated with the image.

13. The method of claim 12, wherein the first projection relationship includes a first rotation angle associated with an orientation of the map.

14. The method of claim 13, wherein the second projection relationship includes a second rotation angle associated with the representation of the image on the second imaging surface.

15. The method of claim 14, wherein the method further includes:
- receiving an instruction to adjust an orientation of the joint display of the image and the map;
- adjusting the first rotation angle associated with the orientation of the map and the second rotation angle associated with the representation of the image on the second imaging surface; and
- updating the joint display of the image and the map according to the adjusted first rotation angle and the adjusted second rotation angle.

16. The method of claim 12, wherein the first projection relationship includes a first scale associated with a zooming effect of the map.

17. The method of claim 16, wherein the second projection relationship includes a second scale associated with a zooming effect of the image.

18. The method of claim 17, wherein the method further includes:
- receiving an instruction to adjust a field of view in the joint display of the image and the map;
- adjusting the first scale associated with the zooming effect of the map and the second scale associated with the zooming effect of the image; and
- updating the joint display of the image and the map according to the adjusted first scale and the adjusted second scale.

* * * * *